United States Patent Office 3,086,977
Patented Apr. 23, 1963

3,086,977
BASIC ANTHRAQUINONE DYESTUFFS
Melvin N. Turetzky, East Brunswick, N.J., assignor to General Aniline & Film Corporation, New York, N.Y., a corporation of Delaware
No Drawing. Filed Jan. 12, 1960, Ser. No. 1,858
7 Claims. (Cl. 260—272)

This invention relates to certain basic anthraquinone dyestuffs and to a method of preparing the same. More particularly, this invention relates to novel anthraquinone dyestuffs which have unusual affinity for synthetic fibers and to a method of producing said dyestuffs.

An important object of this invention is the provision of novel anthraquinone dyestuffs which have unusual affinity for polyacrylonitrile and modified acrylic fibers.

Another object of this invention is the provision of an improved process for preparing the novel anthraquinone dyestuffs wherein no extraneous heat is required.

Other objects and advantages of this invention will appear from the following detailed description.

The starting or base materials used in this invention have the general structure

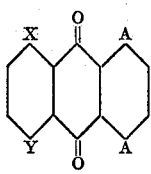

where A stands for hydroxyl or amino, both positions may or may not be identically substituted, and where X and Y stand for hydrogen, hydroxyl, amino, alkylamino, arylamino, cycloalkylamino, hydroxyalkylamino, alkoxylalkylamino or halogen. Examples of suitable starting materials are 1-hydroxy-4-aminoanthraquinone
1,4,5,8-tetrahydroxyanthraquinone
1-amino-4-hydroxy-5-chloroanthraquinone
1,8-dihydroxy-4,5-diaminoanthraquinone
1,5-dihydroxy-4,8-diaminoanthraquinone
1,4 - dihydroxy - 5,8 - di($\beta$-phenylethylamino) anthraquinone
1,4,5-trihydroxy-8($\beta$-phenylethyl)aminoanthraquinone
1,4,5-trihydroxy-8-sulfolanylaminoanthraquinone
1,4-bis($\beta$-hydroxyethyl-5,8-dihydroxyanthraquinone This invention has the outstanding attribute of producing dyestuffs in shades ranging from orange and red to blue and green. These dyestuffs have excellent lightfastness and build-up and are simply produced in a single step from the above starting materials. It should be noted that these same starting materials show pronounced deficiencies in the coloration of synthetic fibers in exactly those properties in which the products of this invention excel.

The products of this invention are prepared by reaction of the aforesaid base materials with a halogen such as, for example, chlorine or bromine in pyridine for several hours at room temperature after which time the product may be isolated by filtration.

This method has the advantage of requiring no heat, thus avoiding the numerous side reactions often occurring with these reactive starting materials. In addition, the product is insoluble in the solvent whereas the starting material is soluble thus affording a simple means of purification.

Another advantage of this invention is that it produces water-soluble dyestuffs capable of dyeing synthetic fibers directly from an aqueous bath thus avoiding the necessity for dispersion, cuprous-ion treatment, or any of the various techniques required by water-insoluble dyestuffs.

While it is not intended to limit the scope of the invention by this theoretical consideration, it is believed that the products of this invention are mixed mono- and di-pyridinium halides, i.e. chlorides or bromides, derived from substitution in the beta positions of the ring bearing the "A" substituents.

The present invention is illustrated but not limited by the following examples in which the parts are by weight.

Example 1

9 parts of 1-hydroxy-4-aminoanthraquinone are dissolved in 125 parts of pyridine and then 5.7 parts of bromine are added to the solution while stirring. The reaction mixture is stirred at room temperature for two hours, then is filtered and washed with pyridine and acetone until the washings are colorless. After drying about 9 parts of a deep violet dyestuff are isolated.

This product dyes polyester and polyacrylonitrile fibers a brilliant red-violet of excellent fastness properties directly from an aqueous dye bath.

Example 2

9.0 parts of 1,4-dihydroxy-5,8-di($\beta$-phenylethylamino) anthraquinone are dissolved in 125 cc. of pyridine and the reaction carried out substantially as in Example 1.

The product is a green-blue dyestuff of excellent affinity.

Example 3

14.1 parts of 1,4,5-trihydroxy-8 ($\beta$-phenylethyl)aminoanthraquinone are treated as in Example 1.

The product is a grey-blue dystuff.

Example 4

14.6 parts of 1,4,5-trihydroxy-8-sulfolanylaminoanthraquinone are treated exactly as in Example 1.

The product is a blue dye of excellent affinity for polyacrylonitrile fibers and shows no significant fading after 20 hours in the fadeometer.

Example 5

4.0 g. of 1-hydroxy-4-aminoanthraquinone are added to 50 cc. of pyridine and chlorine gas is bubbled in for 15 minutes while the reaction is maintained at room temperature. The reaction is filtered and washed with acetone until the washings are colorless. The product on the funnel is dryed at 90–95° C. yielding 3.4 g. of a red-violet dyestuff. This product is completely soluble in water and these aqueous solutions dye polyacrylonitrile and polyester fibers a brilliant red-violet without the aid of any dyeing assistants.

I claim:

1. Process for preparing water-soluble anthraquinone compounds, which comprises reacting a halogen selected from the group consisting of chlorine and bromine in pyridine with a compound of the formula

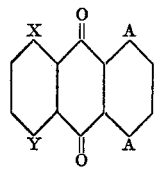

where A is a radical selected from the group consisting of hydroxyl and amino and where X and Y are each a radical selected from the group consisting of hydrogen, hydroxyl, amino, $\beta$-phenylethylamino, $\beta$-hydroxyethyl, chloro, bromo and sulfolanylamino.

2. Process for preparing water-soluble anthraquinone compounds, which comprises reacting chlorine in pyridine with a compound of the formula

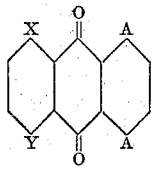

where A is a radical selected from the group consisting of hydroxyl and amino and where X and Y are each a radical selected from the group consisting of hydrogen, hydroxyl, amino, β-phenylethylamino, β-hydroxyethyl, chloro, bromo and sulfolanylamino.

3. Process for preparing water-soluble anthraquinone compounds, which comprises reacting bromine in pyridine with a compound of the formula

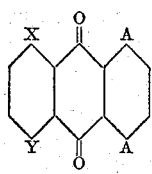

where A is a radical selected from the group consisting of hydroxyl and amino and where X and Y are each a radical selected from the group consisting of hydrogen, hydroxyl, amino, β-phenylethylamino, β-hydroxyethyl, chloro, bromo and sulfolanylamino.

4. Process for preparing a water-soluble anthraquinone compound, which comprises reacting chlorine in pyridine with 1-hydroxy-4-aminoanthraquinone.

5. Process for preparing a water-soluble anthraquinone compound, which comprises reacting bromine in pyridine with 1-hydroxy-4-aminoanthraquinone.

6. Process for preparing a water-soluble anthraquinone compound, which comprises reacting 1,4-dihydroxy-5,8-bis (β-phenylethylamino)-anthraquinone with bromine in pyridine.

7. Process for preparing a water-soluble anthraquinone compound, which comprises reacting 1,4,5-trihydroxy-8 (β-phenylethylamino) anthraquinone with bromine in pyridine.

References Cited in the file of this patent
UNITED STATES PATENTS

| | | |
|---|---|---|
| 2,026,150 | Utizinger et al. | Dec. 31, 1935 |
| 2,226,909 | Peter | Dec. 31, 1940 |
| 2,624,746 | Dickey | Jan. 6, 1953 |
| 2,642,445 | Lecher et al. | June 16, 1953 |
| 2,990,413 | Gehrke | June 27, 1961 |

OTHER REFERENCES

Houben: Die Methoden der Organischen Chemie, vol. 3, pp. 1144–1145 (1930).

Migrdichian: Organic Synthesis, vol. II, p. 1562 (1957).